United States Patent
Akbay

(10) Patent No.: US 12,142,978 B2
(45) Date of Patent: Nov. 12, 2024

(54) METHOD FOR OPERATING AN ELECTRIC MACHINE AND ELECTRIC MACHINES

(71) Applicant: Ulusar Akbay, Ankara (TR)

(72) Inventor: Ulusar Akbay, Ankara (TR)

( * ) Notice: Subject to any disclaimer, the term of this patent is extended or adjusted under 35 U.S.C. 154(b) by 94 days.

(21) Appl. No.: 17/633,273

(22) PCT Filed: Aug. 5, 2020

(86) PCT No.: PCT/DE2020/000181
§ 371 (c)(1),
(2) Date: Feb. 7, 2022

(87) PCT Pub. No.: WO2021/023326
PCT Pub. Date: Feb. 11, 2021

(65) Prior Publication Data
US 2022/0360126 A1  Nov. 10, 2022

(30) Foreign Application Priority Data

Aug. 6, 2019  (DE) ...................... 10 2019 005 503.9

(51) Int. Cl.
*H02K 3/04* (2006.01)
*H02K 3/32* (2006.01)
*H02K 7/00* (2006.01)

(52) U.S. Cl.
CPC ............. *H02K 3/04* (2013.01); *H02K 3/32* (2013.01); *H02K 7/003* (2013.01)

(58) Field of Classification Search
CPC ............. H02K 3/04; H02K 3/32; H02K 7/003
USPC ........................................................ 310/208
See application file for complete search history.

(56) References Cited

U.S. PATENT DOCUMENTS

| | | | | |
|---|---|---|---|---|
| 6,590,312 B1 * | 7/2003 | Seguchi | ................... | B60K 6/40 |
| | | | | 310/156.01 |
| 2005/0253464 A1 * | 11/2005 | Sugita | ................... | H02K 41/03 |
| | | | | 310/12.15 |
| 2006/0138879 A1 * | 6/2006 | Kusase | ................... | H02K 21/22 |
| | | | | 310/156.43 |
| 2015/0042182 A1 | 2/2015 | Glover | | |
| 2016/0105135 A1 * | 4/2016 | Torrey | ...................... | H02P 6/10 |
| | | | | 318/400.23 |

(Continued)

FOREIGN PATENT DOCUMENTS

DE   102004050327 B3   6/2006
EP         0624945 A1  11/1994

(Continued)

OTHER PUBLICATIONS

Busch et al., English Machine Translation of DE10204050327 (Year: 2006).*

(Continued)

*Primary Examiner* — Rashad H Johnson
(74) *Attorney, Agent, or Firm* — Laurence A. Greenberg; Werner H. Stemer; Ralph E. Locher

(57) ABSTRACT

In a method for operating an electric machine with at least two coils and a magnetizable, movable core such as an armature or a rotor, a current of a constant average value is applied from a direct current source at the coils in such a way that the device is operated in the magnetic saturation range of the core. More particularly, one linear and one rotational actuator is proposed for such an operating mode.

25 Claims, 9 Drawing Sheets

(56) References Cited

U.S. PATENT DOCUMENTS

| | | | | |
|---|---|---|---|---|
| 2016/0352203 A1* | 12/2016 | Kusase | ................. | H02K 19/12 |
| 2017/0264176 A1* | 9/2017 | Bernot | ................... | H02K 1/145 |
| 2019/0214883 A1* | 7/2019 | Klassen | ................ | H02K 7/088 |
| 2019/0385779 A1* | 12/2019 | Kawarai | .................. | H01F 3/14 |
| 2020/0162003 A1* | 5/2020 | Takahashi | ............. | H02K 1/187 |
| 2020/0203049 A1* | 6/2020 | Schudt | ...................... | H01F 7/16 |
| 2020/0328640 A1* | 10/2020 | Takahashi | ................ | H02K 1/14 |
| 2020/0395878 A1* | 12/2020 | Takahashi | ................. | H02P 5/00 |
| 2021/0249922 A1* | 8/2021 | Takahashi | ............. | H02K 11/33 |
| 2021/0265885 A1* | 8/2021 | Takahashi | ............. | H02K 21/22 |
| 2021/0328488 A1* | 10/2021 | Takahashi | ............... | H02K 3/47 |
| 2021/0367465 A1* | 11/2021 | Takahashi | .............. | H02P 27/08 |
| 2021/0367494 A1* | 11/2021 | Takahashi | ........... | H02K 15/022 |
| 2021/0384784 A1* | 12/2021 | Takahashi | ........... | H02K 1/2791 |
| 2021/0384794 A1* | 12/2021 | Tamura | ................ | H02K 3/522 |
| 2022/0311289 A1* | 9/2022 | Tavernier | ............... | H02K 1/185 |
| 2023/0268815 A1* | 8/2023 | Hagnestål | ............... | H02K 3/47 |
| | | | | 310/180 |

FOREIGN PATENT DOCUMENTS

| | | | |
|---|---|---|---|
| EP | 2012413 A1 | 1/2009 | |
| JP | S6158449 A | 3/1986 | |
| WO | 2017118855 A1 | 7/2017 | |

OTHER PUBLICATIONS

Fuerguth et al., English Machine Translation of EP2012413 (Year: 2009).*

* cited by examiner

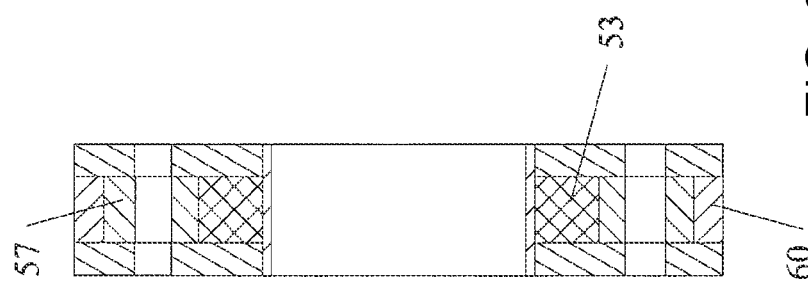
FIG. 9
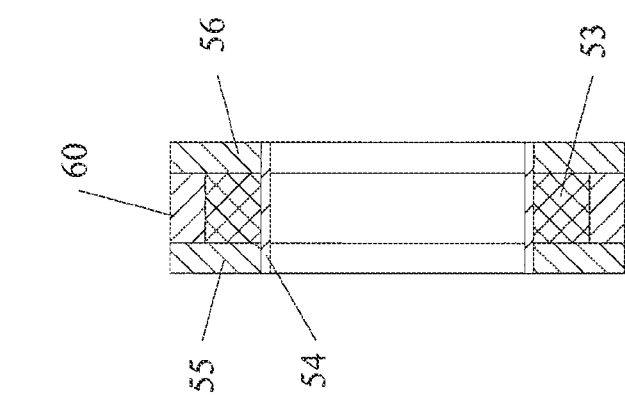
FIG. 8
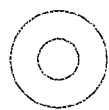
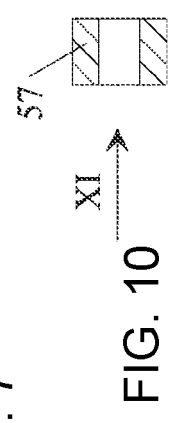
FIG. 10
FIG. 11
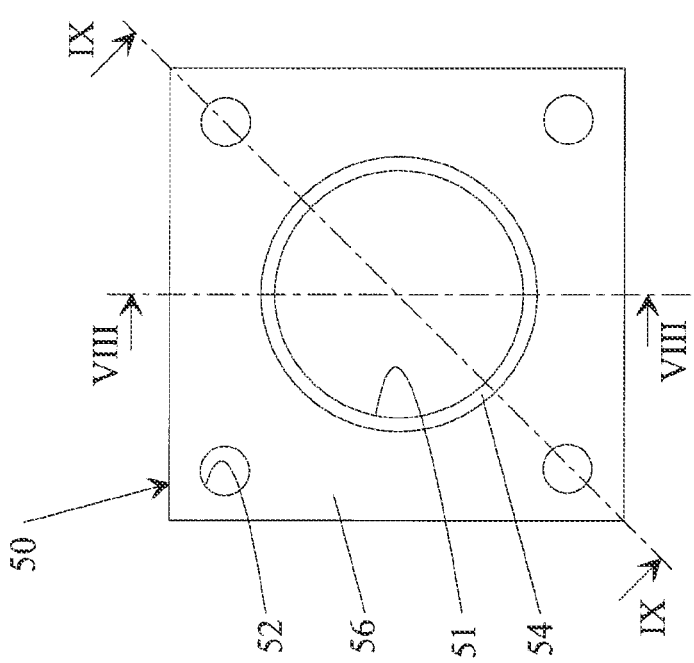
FIG. 7

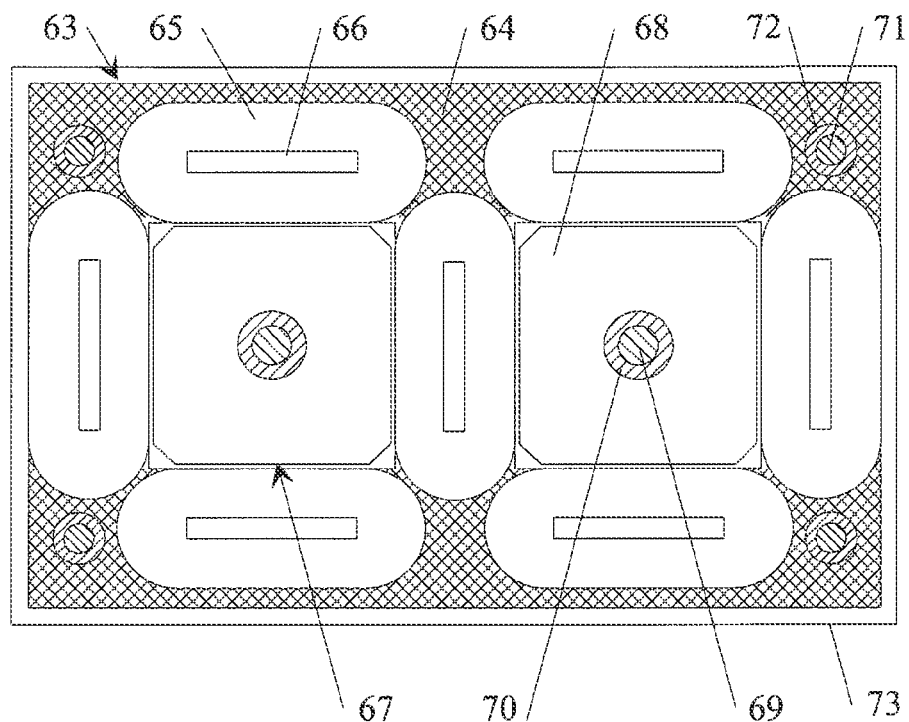
FIG. 12
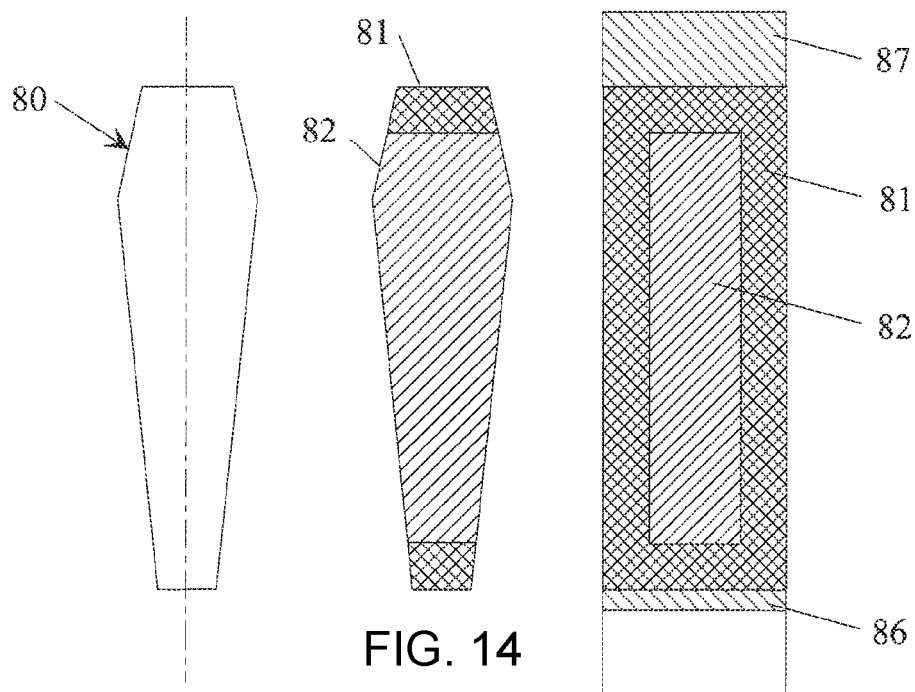
FIG. 13
FIG. 14
FIG. 15

METHOD FOR OPERATING AN ELECTRIC MACHINE AND ELECTRIC MACHINES

FIELD AND BACKGROUND OF THE INVENTION

The invention relates to a method for operating an electric machine and to electric machines suitable for this method.

Electrical machines and their operating methods are known and proven in many different forms. In principle, electrical machines can be distinguished according to the type of movement of a moving core. In linear motors, an armature as the core performs a linear motion, while in rotary actuators a rotor as the core rotates.

This terminology will be used in the following.

From Wikipedia, the free encyclopedia, a reluctance motor with a stator and a rotor is known. The stator has radially inwardly directed pivots as coil cores, which are switched on and off sequentially in the direction of rotation of the rotor. The magnetic forces caused by this set vane-like pads of the rotor, which is radially enclosed by the stator, in motion. When designing the rotor, it is advantageous that it can be manufactured without coils, magnets or special materials. This is based on the principle that the torque of the rotor is essentially generated by the reluctance force and not by the Lorenz force.

SUMMARY OF THE INVENTION

On the other hand, a reluctance motor has a low torque density, the nominal torque in relation to the volume of the machine is lower than in a synchronous motor, for example. Against this background, the invention makes it part of its task to provide electrical machines that can be adapted in a simple manner to a wide variety of tasks due to their modular design and that can still be operated economically.

Thus, according to the independent method claim, it is at first proposed for a method for operating an electric machine with at least two coils comprising a magnetizable movable core such as an armature or a rotor, that a current of constant average value of a DC voltage source is applied to the coils in such a way that operation of the device takes place in the magnetic saturation range of the core, preferably the saturation being more than 103 A/cm.

Such a value can be achieved with a core that has soft iron or at least one stack of sheets, for example, transformer sheets, dynamo sheets, or the like.

To keep the power loss of a machine operated in this way as low as possible, the magnetic saturation of this soft iron or sheet should be as high as possible.

An advantage of the method according to the invention is the operation of an electrical machine with an operating voltage which is lower than the contact voltage, in particular lower than 60 V, preferably lower than 40 V.

This measure also has the effect that the coils, which are operated with a large current of, for example, more than 40 A, can be cooled directly by a cooling liquid and wet operation is possible.

The method according to the invention is suitable both for rotary actuators, in which the core, the rotor, performs a rotary motion when a current is applied to the coils, and for translational actuators, in which the core, the armature, performs a linear motion.

For carrying out the process according to the invention, coils have proved to be particularly suitable which are characterized by a winding of a conductive foil extending over an area, the windings being separated by an insulating layer.

In particular, this involves foils made of copper or aluminum, the windings of which are electrically insulated from one another by a paper web, for example, or possibly by a simple layer of varnish.

Such a coil has two advantages for carrying out the process according to the invention, being comparatively insensitive to high electric currents of, for example, 40 A and more. Moreover, such a coil can be easily manufactured and, perpendicular to the layers of the winding, mechanically processed, in particular cut, sawed or drilled, since the windings themselves are not then damaged, but only the conductor cross-section. This way, the production of a coil blank can take place on an elongated core, after which coils can be separated by sawing or cutting.

In this case, it is preferred that the film and the insulating layer are formed in one piece. In particular, a copper-clad Teflon film may be considered, whose PFTE layer has a material thickness of 10 micrometers, for example, while the CU layer is 30 micrometers thick.

Such coils further allow a tapered design that can be assembled to form a circular ring, a stator of a rotary actuator, with almost no spacing.

The core of the electrical machines according to the invention is formed by at least one magnetizable stack of sheets on a central, non-magnetizable shaft.

Here, in a constructional design, it is envisaged that spacer sleeves are guided on the shaft, which brace the stack of sheets between shaft-fixed head plates and/or space several stack of sheets. The spacer sleeves are also non-magnetizable, which means that magnetic forces only act on the stack of sheets.

In a further design of such an actuator, it is provided that the core moves with the stack of sheets by means of a plurality of coils or past a plurality of coils that are immediately adjacent or evenly spaced, or that the stacked sheets of the core move past a plurality of coils that form an annulus.

In the case of a linear actuator that performs only one stroke or that is designed as a spring, the core will move through or past evenly spaced coils. If rather a linear actuator of the linear motor type is intended, such coils will preferably be arranged directly adjacent.

In rotary actuators, the stack of sheets forms poles through wings that move between a plurality of coils forming two coaxial circular rings.

Due to the above explained design of a coil, it can be further provided in a linear actuator that a coil arrangement is rectangular, in particular square, with a central passage for the core or armature.

Constructively, such a coil arrangement has the additional advantage that the coil arrangement can be provided with openings on the corner side, each of which is penetrated by a mounting shaft, and that spacer sleeves are guided on the mounting shaft, spacing the coil arrangement and/or bracing head plates between two mounting shaft remnants.

Further, this measure may provide that a head batten of the armature is provided with openings through which spacer sleeves of the coil arrangement formed as guides pass. It is then expedient to provide plain bearings in the openings. In an advantageous manner, spacer sleeves are thus used both for mounting the coil arrangements and for guiding the armature.

In an alternative design of linear actuator, the coils are arranged on a winding core in a ring around the core.

The power of an electrical machine of this design can be expanded almost indefinitely by connecting such actuators in parallel and/or in series. A mechanical parallel connection can be made in a simple way by connecting the cores on both sides to a common head plate. Also, such a head plate for several actuators can be provided with perforations and sliding bearings, which are guided on spacer sleeves for bracing in front of coil arrangements.

In a rotary actuator, the coils are tapered and assembled to form a circular coil arrangement. In particular, it is intended that at least two coil arrangements are provided which, with respect to a shaft of the rotor, are axially spaced and aligned. Constructively simple, such a circular coil arrangement can be obtained by the coil arrangement having a radially inner positioning ring for the coils, for example made of a potting material. In a further design, it is then provided that the coil arrangement has a radially outer positioning ring for the coils, that the positioning ring has openings for mounting shafts, that spacer sleeves are guided on the mounting shafts, which space the coil arrangements apart and clamp them between two head plates fixed to the mounting shafts. If the outer positioning ring is also made of a potting compound, the compressive strength is provided by pipe sections inserted into the potting compound.

Further, a non-magnetizable rotor shaft is provided with at least one magnetizable stack of sheets with radially arranged vanes that dip into the space between two coil assemblies.

As in the previous design examples, it is further provided that spacer sleeves are guided on the rotor shaft, which brace the stack of sheets between head battens fixed to the rotor shaft and/or space several stack pf sheets.

Finally, a non-magnetizable housing may still be provided for a machine or actuator according to the invention.

The essence of the invention is explained in more detail with reference to the drawing, in which only design examples are shown.

BRIEF DESCRIPTION OF THE FIGURES

FIG. 11: a view according to arrow XI in FIG. 10,
FIG. 12: a variant of a coil arrangement,
FIG. 13: a tapered coil arrangement,
FIG. 14: a section parallel to the drawing plane of FIG. 13,
FIG. 15: a section according to line XV, XV in FIG. 16,
FIG. 16: section of a stator of a rotary actuator.

DETAILED DESCRIPTION OF THE INVENTION

A Linear Actuator

Figure 1:
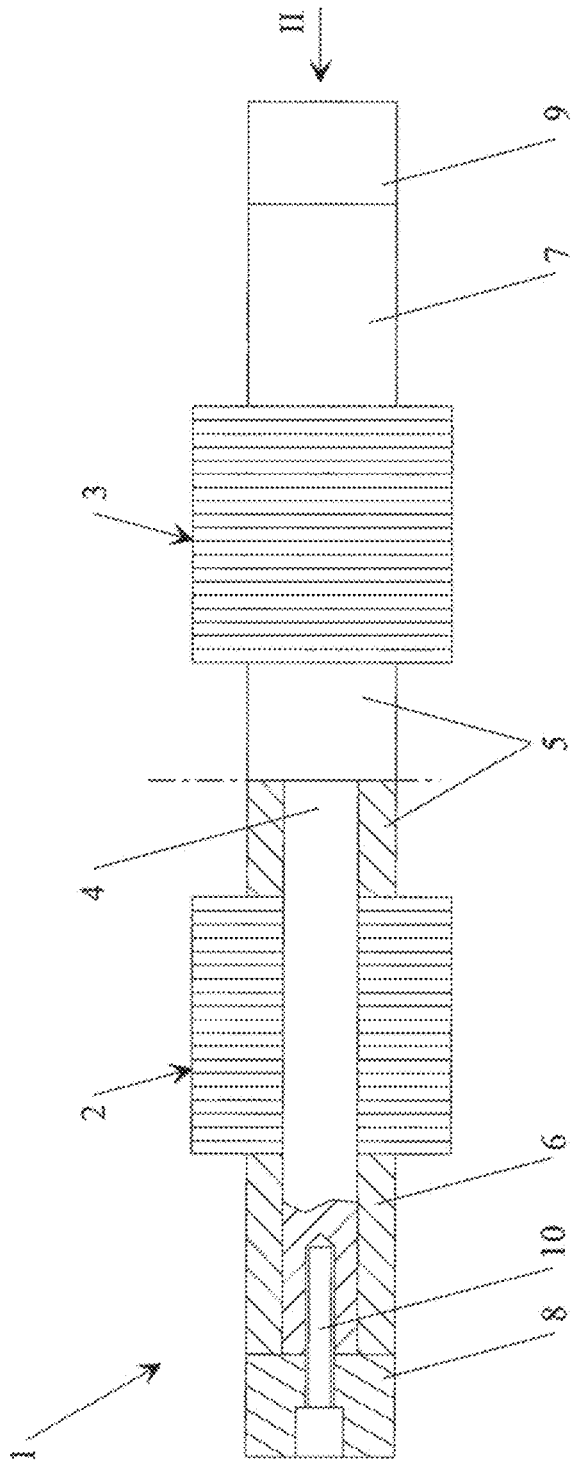
FIG. 1: partially cut a core or an armature for a linear actuator.
Figure 2:
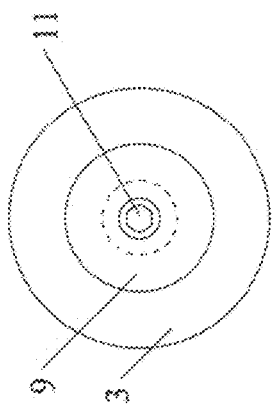
FIG. 2: a frontal view according to the arrow II in FIG. 1,
FIG. 3: in a top view the bearing of several armature.
Figure 3:
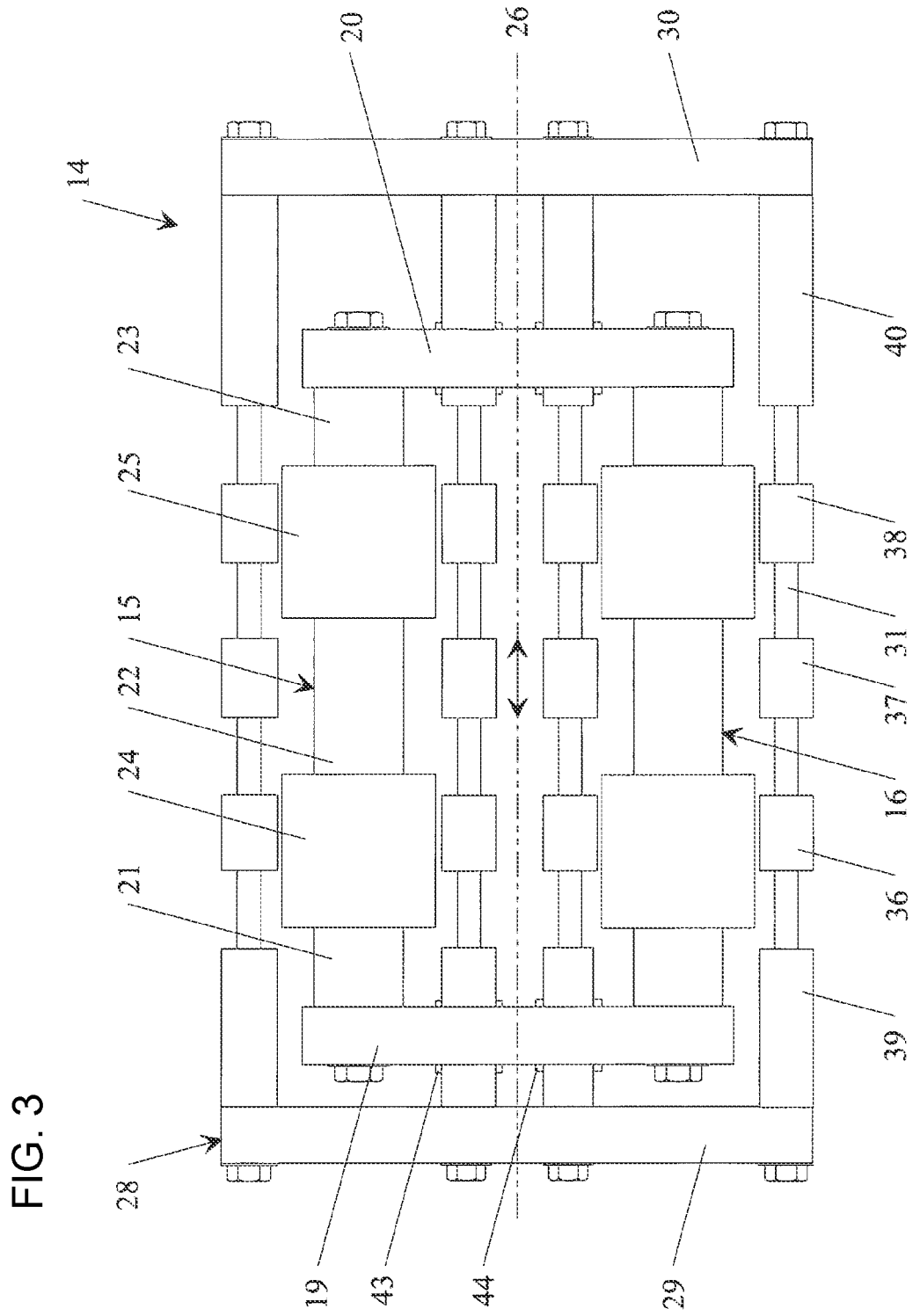
Figure 4:
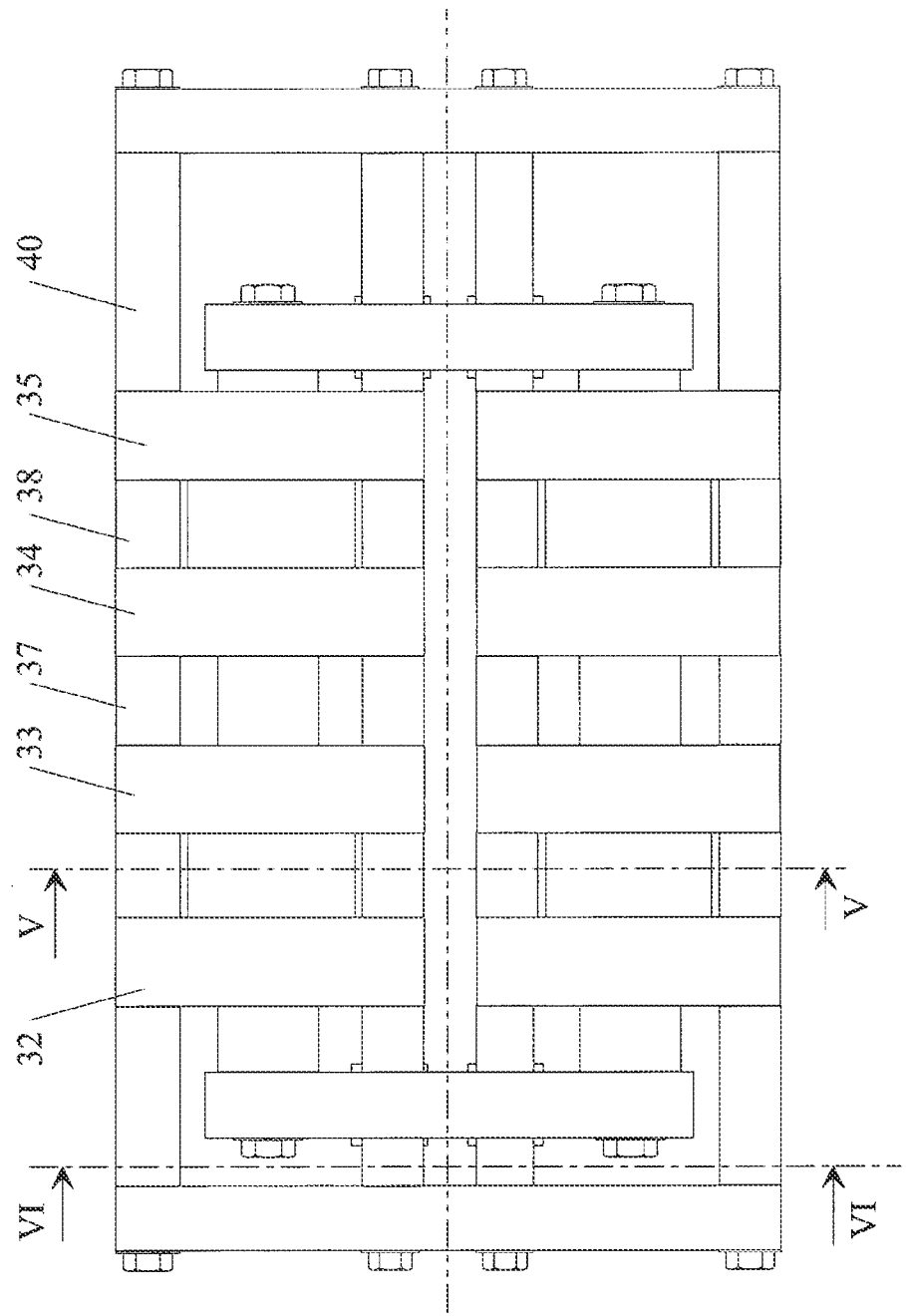
FIG. 4: the arrangement of coils with respect to the armatures in FIG. 3,
FIG. 5: a cut according to the line V, V in FIG. 4,
FIG. 6: a cut according to the line VI, VI in FIG. 4,
FIG. 7: a view of a coil corresponding to FIG. 5,
FIG. 8: a cut according to the line VIII, VIII in FIG. 7,
FIG. 9: a cut according to the line IX, IX in FIG. 7,
FIG. 10: a spacer.

FIG. 1 shows a core or armature 1 cut in the left half of the picture for a linear movement in the axial direction. In this design example, the armature 1 is provided with two stack of sheets 2,3 on a non-magnetic central shaft 4. The stacks of sheets 2,3 consisting of a plurality of, for example, radially oriented transformer sheets, dynamo sheets III or IV or the like of a typical material thickness of 0.5 mm have, like the shaft 4, a circular cross-section, cf. FIG. 2. The magnetic saturation of such sheets should be as high as possible, currently up to 2.3 104 Gauss, in order to minimize conduction loss. The stacks of sheets 2,3 are spaced from each other by a spacer sleeve 5 on the shaft 4. The sheet packs 2,3 are spaced from each other by a spacer sleeve 5 on the shaft 4. The non-magnetic spacer sleeves 5 to 7 and the two plate packs 2,3 are braced between two head plates 8,9, which are fixed to the shaft 4 with screws 10,11.

Such an armature 1, in conjunction with coils setting it in motion, forms a module, as it were, which can be connected in parallel and/or in series with further modules.

Thus, with reference to FIGS. 3 to 11, the structure of a translational actuator 14 with four parallel-connected armatures 15 to 18, which are rigidly connected to each other via common head plates 19,20, is further explained. As in the previous design example shown in FIG. 1, two stacks of sheets 24, 25 are clamped between the head plates 19, 20 and each armature 15 to 18 between spacer sleeves 21 to 23. Essentially, the actuator 14 is symmetrical with respect to a horizontal center plane 26,27 and a vertical center plane 27.

The armatures 15 to 18 held by the head plates 19,20 are linearly displaceable within a cage 28 of preferably a magnetic material according to the double arrow. In the design example, the cage 28 has sixteen mounting bars 31 of the same type between two side elements 29,30. Four mounting rods 31 each pass through four coil arrangements 32 to 35 associated with an armature 15, see also FIG. 5. By means of three spacer sleeves 36 to 38 guided on the shaft 31, the four coil arrangements 32 to 35 are equally spaced in the direction of movement of the armature 15. The air gap between the coil arrangements 32 to 35 and the sheet metal packages 24, 25 of the armature 15 runs between 0.3 and 0.5 mm.

The coil arrangements 32 to 35 with spacer sleeves 36 to 38 arranged between them are braced between the side cheeks 29,30 via two outer spacer sleeves 39,40. The coil arrangements 32 to 35 must be designed to be correspondingly pressure-resistant.

Figure 5:
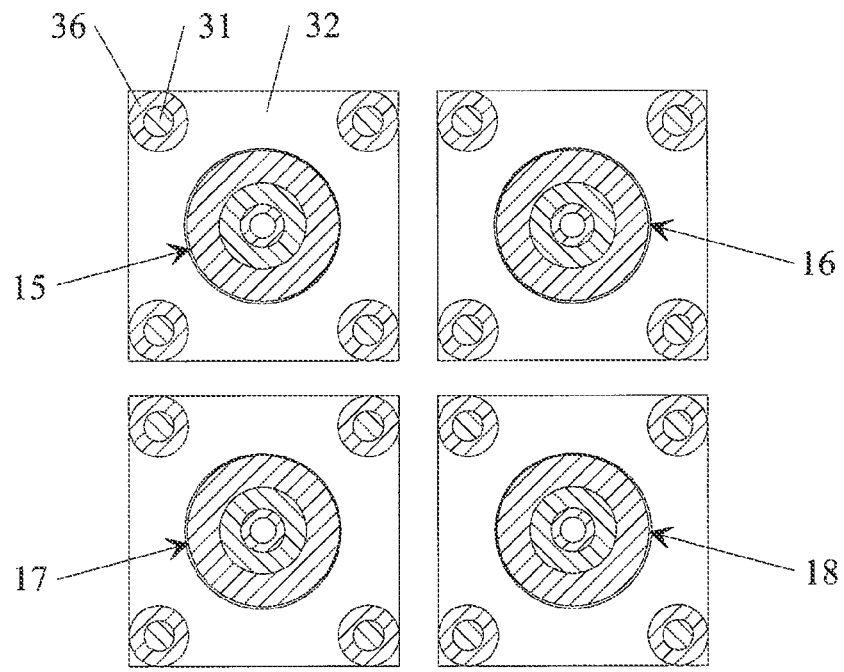
Figure 6:
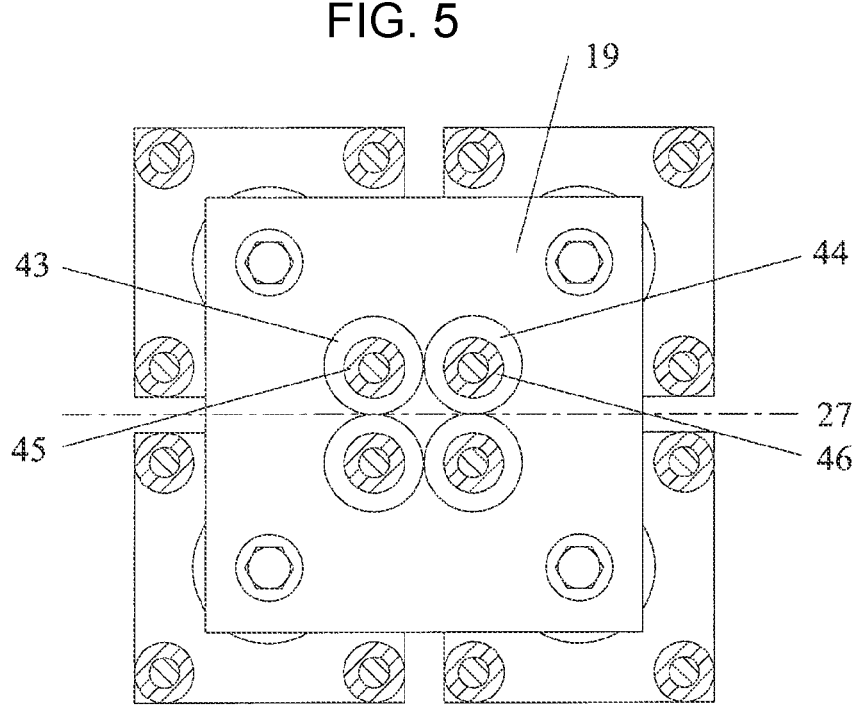

The four anchors 15 to 18 are connected to each other by the common head plates 19,20, cf. FIGS. 5 and 6. The head plates 19,20 are provided with openings in which plain bearings 43,44 are embedded. These plain bearings 43,44 are here exemplarily guided on the inner spacer sleeves 45,46. Alternative bearing options are possible without any problems.

Referring to FIGS. 7 through 11, the structure of a pressure-resistant coil assembly 50 is further explained. The coil assembly 50 has a central aperture 51 for an armature 15 to 18. Four further apertures 52 in the corner regions of the square coil arrangement 50 are used for the passage of mounting rods 31.

The exemplary 100 to 250 windings of the coil 53, for example made of a copper-coated Teflon film with a PFTE layer of a material thickness of 10 μm and a material thickness of the Cu layer of 30 μm on a coil carrier 54, a Teflon film, a self-adhesive Teflon fabric or the like, whose material thickness of approx. 0.125 mm is clearly shown exaggerated in the drawing, are trapped between two non-electrically conductive or to the side supports 55,56.

Coil arrangements 50 as shown in FIG. 7 are also braced between two spacer sleeves and must therefore have sufficient pressure stability. This is ensured by spacers 57 in the form of tubes as shown in FIGS. 10 and 11, which, like the side supports 55,56, are preferably made of a non-magnetic material. These spacers 57 substantially absorb the compressive forces acting on the coil assembly 50 between the side supports 55,56 in the region of the apertures 52.

A circumferential ring of a potting compound 60 such as a casting resin, for example epoxy or polyester, connects the side supports 55,56 and thereby holds the coil assembly 50 together.

Not shown in the drawing are the lead wires of the coil 53, which may be routed through the potting compound 60 or through the side supports 55,56.

Since the operating voltage of the actuator 14 is below the contact voltage, the coil arrangements 32 to 35 can be directly wet cooled.

A section through an alternative coil arrangement 63 is explained with reference to FIG. 12.

Embedded in a potting compound 64, seven coils 64 with cores 65 are arranged around two armatures 66 in this design example. The number of armatures 66 and coils 65 can easily be increased, as in the previous design example. As shown in FIG. 12, only one coil 65 can be arranged between the armatures 66, which is thus used twice.

In this design example, the armatures 67 have stacks of sheets of square cross-section on a shaft 69, which are braced by spacer sleeves 70 as in the previous design example. So that coil arrangements 63 can also be braced on mounting rods 71 in a comparable manner, but the potting compound 64 would generally not withstand the pressure, tube sections 72 are introduced into the potting compound 64 to absorb these compressive forces.

The two armatures 67 exemplified here are molded with the coils 65 in a housing 73 of a non-magnetic material.

The explained design example of a linear actuator can be extended almost arbitrarily. Thus, further armatures and coil arrangements can be arranged in parallel. It is also possible to increase the number of stack of sheets on the shaft of an armature and, consequently, the number of coil arrangements. In both cases, there is an increase in the performance of the actuator.

Another alternative is a linear motor in which an armature is moved by a plurality of coil arrangements which are then preferably arranged directly in series.

A Rotary Actuator

The winding of the coils with flat, self-insulating foils coated with a conductor, preferably copper, alternatively e.g., aluminum, possibly also two-layer windings, a conductive and an insulating foil, has several advantages. Due to the large conductor cross-section, high currents of regularly more than 10 A can flow without any problems. In addition, the geometry of a coil can be changed by sawing, cutting, and drilling perpendicular to the films extending over the surface.

For example, FIG. 13 shows a top view of an outer winding of a coil assembly 80 of conical design. As the sectional view shown in FIG. 14 indicates, the coil assembly 80 has a coil 81 on a core 82, or possibly on a simple winding body.

Such coil arrangements 80 are simple in terms of manufacturing. The winding is applied to a long core, in FIG. 15 perpendicular to the drawing plane. The coil geometry shown in FIG. 13 can then be obtained from such a blank using a laser or by simple sawing. If necessary, the open coil edges must still be reworked so that there is no winding closure.

Figure 16:
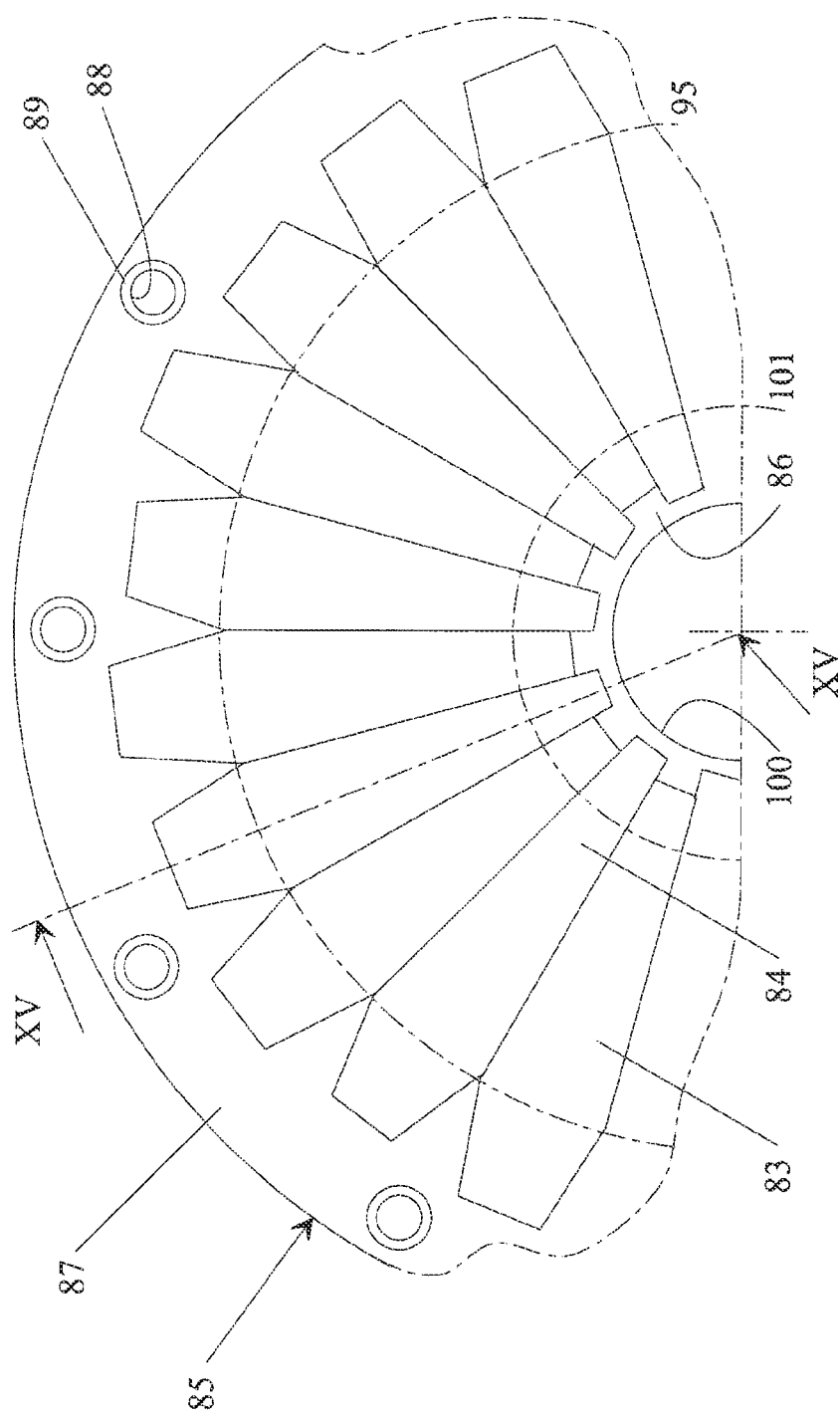

The conical geometry of the coil assembly 80 readily permits an annular arrangement. FIG. 16. The twenty-four coil arrangements 83,84 arranged in a circular ring form the disk-shaped stator 85 of a rotary actuator. Radially inboard, the coil assemblies 83,84 are captured with alternating radial spacing in a mounting and positioning ring 86 that includes a central aperture 100. A further mounting and positioning ring 87 lying radially outward is provided.

Both mounting and positioning rings 86,87 can be created in a simple manner by potting the coil assemblies 83,84 with a synthetic resin or the like. Particularly in the case of potting, it is easily possible to skin the two flat sides of the coil assemblies 83,84 as a sliding surface for an oil film during operation. Other techniques for applying a skin of a material thickness of approx. 0.2 to 0.3 mm thickness can nevertheless be used. In addition, a comparatively thin layer of the potting compound can be used to bond the coil assemblies 83,84 to one another.

In particular, if the outer mounting and positioning ring 87 is made of a cast resin, openings 88 are formed by spacers 89 in the form of tubes to provide pressure stability.

Figure 17:
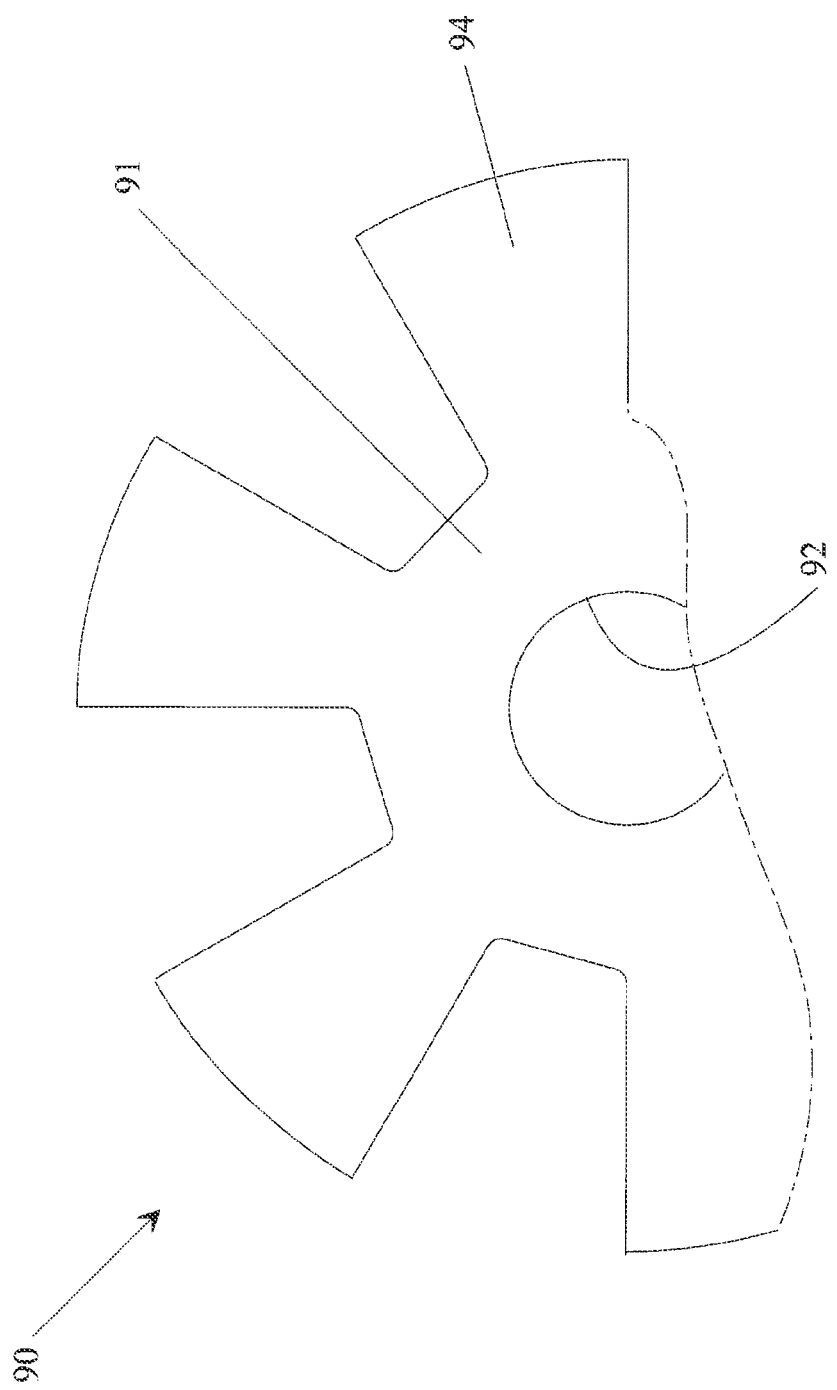
FIG. 17: a rotor as the core of a rotary actuator.

The geometry of the rotor 90 reproduced in detail in FIG. 17 as the core of the rotary actuator, a laminated core consisting of a plurality of transformer laminations as in the case of the armature 1, is basically known. In the embodiment, see FIG. 18, six blades 94 extend radially outward at a central ring 91, the central breakthrough 92 of which is dispersed by a rotor shaft 93—see FIG. 18. The radial extension of the blades 94 of the rotor 90, which is arranged between stators 85, cf. FIG. 18, extends approximately to the dashed circle segment 95 in FIG. 16, and the radial extension of the ring 91 extends to the dashed circle segment 101. Thus, the radially inner mounting and positioning ring 86 is covered by the ring 91 and the blades 94 are securely positioned between the coil assemblies 80, cf. FIG. 9.

Figure 18:
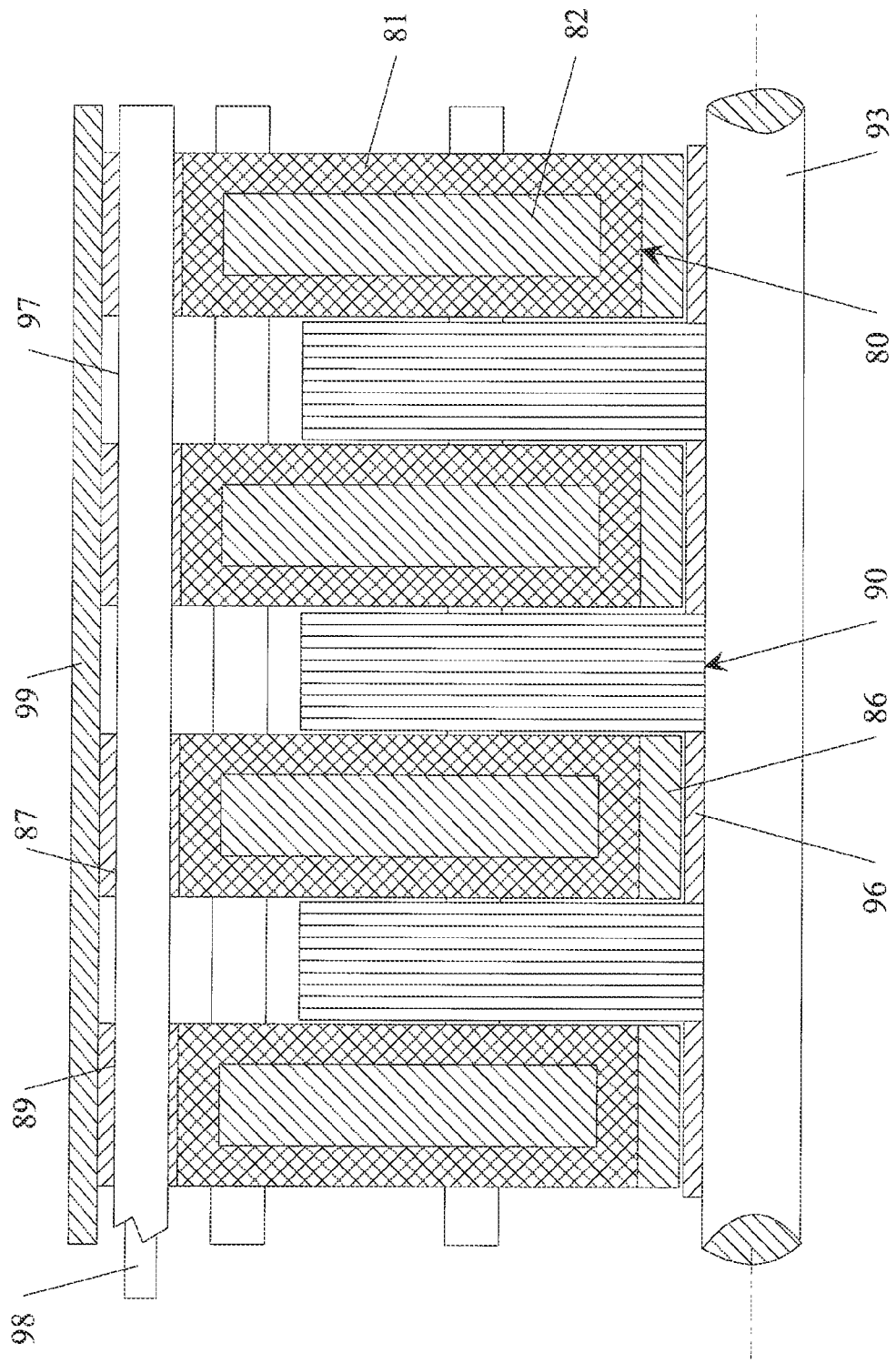
FIG. 18: a rotor as the core of a rotary actuator in section.

The rotary actuator shown in sections in FIG. 18 has three laminated rotors 90 on the rotor shaft 93, connected in series as it were. Comparable to the preceding design examples, the rotors 90 are evenly spaced by spacer sleeves 96 and two coil assemblies 80 enclose one rotor 90. Further modules consisting of a rotor 90 and a coil arrangement 90 can be connected in modular fashion. At the ends of the rotor shaft 93, the outer spacer sleeves are then fixed to the rotor shaft 93, for example as explained for the armature 1. Accordingly, the central aperture 100 of the radially inner mounting and positioning ring 86 is to be dimensioned for the passage of the rotor shaft 93 and the spacer sleeve 96.

An oil film may still be provided in the space between a coil arrangement 80 and a rotor 90, if necessary.

The coil arrangements 80 with the radially outer mounting and positioning ring 87 are also spaced apart by spacer sleeves 97 on mounting rods 98 and braced relative to an indicated housing 99.

The invention claimed is:

1. A method for operating an electric machine with at least two coils and a magnetizable movable core being an armature or a rotor, which comprises the steps of:
   applying a current of a constant average value of a DC voltage source to the at least two coils such that an operation of the electric machine takes place in a magnetic saturation region of the magnetizable movable core.

2. The method according to claim 1, wherein saturation is more than 103 A/cm.

3. The method according to claim 1, wherein the magnetizable movable core contains soft iron or at least one stack of sheets.

4. The method according to claim 1, wherein an operating voltage is lower than a contact voltage.

5. The method according to claim 1, which further comprises cooling the at least two coils directly by a cooling liquid.

6. The method according to claim 1, wherein the magnetizable movable core performs a rotational or translational movement when the current is applied to the at least two coils.

7. A coil, comprising:
an insulating layer; and
windings each formed from a two-dimensionally extending conductive foil, said windings being separated by said insulating layer;
wherein the coil does not cooperate with a permanent magnet.

8. The coil according to claim 7, wherein said two-dimensionally extending conductive foil and said insulating layer are formed integrally.

9. A coil configuration, comprising:
coils each having an insulating layer and windings of a two-dimensionally extending conductive foil, said windings being separated by said insulating layer, said coils being conically shaped to form a circular ring, wherein the coils do not cooperate with a permanent magnet.

10. An electric actuator, comprising:
a core formed by at least one magnetizable laminated core part on a central, non-magnetizable shaft, wherein said core is not a permanent magnet.

11. The actuator according to claim 10, further comprising:
shaft-fixed head plates;
a stack of sheets disposed between said shaft-fixed head plates; and
spacer sleeves being guided on said central, non-magnetizable shaft, and which clamp said stack of sheets between said shaft-fixed head plates and/or space several of said stacks of sheets.

12. The actuator according to claim 11,
further comprising a plurality of coils; and
wherein said core moves with said stack of sheets through or past said plurality of coils which are immediately adjacent or equally spaced, or in that said stack of sheets of said core moves between said plurality of coils forming two coaxial circular rings.

13. The actuator according to claim 12, further comprising a coil arrangement being rectangular in shape with a central through-opening formed therein for said core.

14. The actuator according to claim 13, wherein:
said coil arrangement is one of a plurality of coil arrangements, each of said coil arrangements has on each corner side an opening formed therein and through each of said openings a mounting shaft passes, each coil arrangement has spacer sleeves being guided on each of said mounting shafts which space said coil arrangements and/or clamp them between two said shaft-fixed head plates fixed to said central, non-magnetizable shaft.

15. The actuator according to claim 14, further comprising a top plate, said top plate having openings formed therein and through said openings said spacer sleeves of said coil arrangements formed as guides pass.

16. The actuator according to claim 12, wherein said coils contain a winding core and at least one of said coils is disposed annularly around said winding core.

17. An electrical machine, comprising:
a parallel connection of a plurality of actuators, each of said actuators having a core formed by at least one magnetizable laminated core part on a central, non-magnetizable shaft, wherein said core is not a permanent magnet.

18. The electrical machine according to claim 17, further comprising a common head plate, each said core is connected on both sides to said common head plate.

19. A rotatory actuator, comprising:
coils of a stator being of a conical design and assembled to form a circular coil configuration, wherein the coils do not cooperate with a permanent magnet.

20. The rotatory actuator according to claim 19, further comprising:
a rotor with a shaft; and
at least two coil assemblies which with respect to said shaft of said rotor, are axially spaced and aligned.

21. The rotatory actuator according to claim 19, wherein said circular coil configuration has a radially inner positioning ring for said coils.

22. The rotatory actuator according to claim 19,
further comprising mounting shafts;
further comprising spacer sleeves;
further comprising two head plates; and
wherein said circular coil configuration is one of a plurality of coil configurations, each of said coil configurations have a radially outer positioning ring for said coils, said radially outer positioning ring has openings formed therein for receiving said mounting shafts, said spacer sleeves are guided on said mounting shafts, which space said coil configurations and clamp them between said two head plates fixed to said mounting shafts.

23. The rotatory actuator according to claim 19,
wherein said circular coil configuration is one of a plurality of coil configurations; and
further comprising a non-magnetizable rotor shaft with at least one magnetizable laminated core dipping into a space between two said coil configurations.

24. The rotatory actuator according to claim 23, further comprising:
head plates; and
spacer sleeves being guided on said non-magnetizable rotor shaft, which clamp said magnetizable laminated core between said head plates fixed to said non-magnetizable rotor shaft and/or space several laminated cores.

25. A machine or actuator, comprising:
a device selected from the group consisting of:
a parallel connection of a plurality of actuators, each of said actuators having a first core formed by at least one magnetizable laminated core part on a central, non-magnetizable shaft, wherein said first core is not a permanent magnet; and
a second core formed by said at least one magnetizable laminated core part on said central, non-magnetizable shaft, wherein said second core is not a permanent magnet; and
a non-magnetizable housing.

* * * * *